United States Patent [19]

Dasgupta et al.

[11] Patent Number: 5,432,132

[45] Date of Patent: Jul. 11, 1995

[54] SILICON NITRIDE BASED CUTTING TOOL INSERT

[75] Inventors: Sankar Dasgupta; Rakesh Bhola, both of Toronto, Canada

[73] Assignee: The Electrofuel Manufacturing Co., Toronto, Canada

[21] Appl. No.: 248,672

[22] Filed: May 25, 1994

[51] Int. Cl.$^6$ .......................................... C04B 35/596
[52] U.S. Cl. ........................................ 501/97; 501/98; 51/307
[58] Field of Search ...................... 501/97, 98; 51/307, 51/309

[56] References Cited

U.S. PATENT DOCUMENTS

| | | | |
|---|---|---|---|
| 4,425,141 | 1/1984 | Buljan et al. | 51/309 |
| 4,433,979 | 2/1984 | Sarin et al. | 51/307 |
| 4,578,087 | 3/1986 | Tanaka et al. | 501/97 X |
| 4,818,635 | 4/1989 | Ekstrom et al. | 501/98 X |
| 4,881,950 | 11/1989 | Bhat et al. | 51/307 |
| 4,900,700 | 2/1990 | Jun et al. | 501/78 |
| 5,093,290 | 3/1992 | Furukawa et al. | 501/97 |
| 5,250,477 | 10/1993 | Baldoni, II et al. | 501/95 |

*Primary Examiner*—Karl Group

[57] ABSTRACT

A silicon nitride based composition for manufacturing sintered ceramic articles, in particular cutting tool inserts, having improved density, hardness and fracture toughness characteristics is described. The amounts of yttrium oxide, aluminum nitride and titanium nitride contained in the silicon nitride based mixture are interrelated by a formula to attain substantially improved abrasion resistance.

8 Claims, No Drawings

SILICON NITRIDE BASED CUTTING TOOL INSERT

FIELD OF THE INVENTION

This invention relates to ceramic cutting tool inserts utilized in machining metals, more particularly to silicon nitride based cutting tool inserts.

BACKGROUND TO THE INVENTION

Ceramic cutting tool inserts are required to be hard, resistant to fracture and chipping, resistant to wear during high speed cutting and machining operations, resistant to oxidation and chemical corrosion or attack by the substance to be cut, resistant to heat and capable of dissipating heat generated by cutting and machining, and be relatively inexpensive to manufacture.

There are several types of ceramic cutting tool inserts which have the above desired properties in different degrees. One group of conventional ceramic cutting tool inserts are silicon nitride based. It is known to increase the hardness, thereby the wear resistance, and the fracture toughness of silicon nitride cutting inserts by adding densifying agents, such as various oxides, aluminum nitride and oxide, and refractory metal nitrides and carbides to the silicon nitride. It is commonly believed most of the above additives form glassy phases at the boundary of the silicon nitride particles, thereby leading to more dense products.

It is also known that the addition of nitrides such as titanium nitride, may further improve the performance of silicon nitride cutting tool inserts by providing solid state lubrication during high speed cutting of metals. Some conventional cutting tools are coated with a titanium nitride layer.

U.S. Pat. No. 4,900,700 issued to Jun et al. on Feb. 13, 1990, describes a ceramic composite containing silicon aluminum oxynitride with up to 10 weight percent titanium nitride. U.S. Pat. No. 5,250,477 issued to Baldoni II et. al. on Oct. 5, 1993, teaches a composite cutting tool and articles for similar use, made of silicon nitride, alumina and other oxides as densifying aids, additionally containing nitrides, carbides, borides and carbonitrides of transition metals in the form of particles and/or whiskers. Both the above patents specify broad composition ranges of the additives in amounts unrelated to one another.

It has been surprisingly found that desired properties of silicon nitride based ceramic cutting tool inserts may be notably improved if the additives for increasing hardness and density are present in interrelated amounts.

SUMMARY OF THE INVENTION

A densified silicon nitride based ceramic cutting tool insert is provided which additionally comprises aluminum nitride, yttrium oxide and titanium nitride in interrelated amounts such that the ratio of yttrium oxide in weight percent to the aluminum nitride in weight percent is close to three.

In one embodiment of the invention, the yttrium oxide is present in amounts twice that of titanium nitride which has also been added to the mixture. The sum total of the yttrium oxide, aluminum nitride and titanium nitride, each expressed in weight percent in the silicon nitride mixture, is $7.1\pm0.5$ to provide a densified product having fracture toughness in excess of 7 MPa·m$^{\frac{1}{2}}$.

In another embodiment of the present invention the amount in weight percent of yttrium oxide and aluminum nitride taken together, is a third of the titanium nitride also added to the silicon nitride mixture. The sum total of the weight percents of yttrium oxide, aluminum nitride and titanium nitride in the silicon nitride mixture is $20\pm0.5$ to provide a densified product having hardness in excess of 16.5 GPa and fracture toughness in excess of 7 MPa·m$^{\frac{1}{2}}$.

The preferred embodiments of the present invention will be described hereinbelow and its advantages illustrated by working examples.

DETAILED DESCRIPTION OF THE PREFERRED EMBODIMENTS

As has been discussed above, ceramic cutting tool inserts are required to be hard, have high fracture toughness, resist oxidation and chemical corrosion and generally be abrasion resistant. Yttrium oxide and aluminum nitride have often been referred to as glass forming densifying aids. The desirable properties listed above have been found to be more readily attained by adding yttrium oxide and aluminum nitride in relatively low but interrelated amounts to the silicon nitride based ceramic mixture. It has now been surprisingly found that densification of silicon nitride is increased and hence, the abrasion resistance of the silicon nitride cutting tool insert is also enhanced when the ratio of the admixed yttrium oxide to aluminum nitride, expressed in weight percent, is close to 3.

A refractory metal nitride, preferably titanium nitride, was found to further increase the hardness of an article made of a sintered silicon nitride based mixture. Silicon nitride based cutting tool inserts are often utilized in machining and cutting metal, more particularly cast iron and high nickel-containing steel, such as for example, Waspaloy and Inconel 905. It is also known that titanium nitride when added to the silicon nitride based mixture as a component and subsequently sintered, may act as a solid state lubricant in metal cutting and machining operations. Furthermore, it has been found that, in machining cast iron a silicon nitride based cutting insert containing relatively low amounts of titanium nitride is preferred, while in cutting and machining high nickel-containing alloys a higher titanium nitride containing silicon nitride based cutting tool insert provides a better performance. It has now also been found that abrasion resistance and wear resistance of the silicon nitride based cutting tool inserts are markedly improved when the composition of the cutting tool insert is such that the titanium nitride weight percent in the silicon nitride mixture is related to the already interrelated amounts of yttrium oxide and aluminum nitride.

In particular, it has been found that the preferred composition for a silicon nitride based cutting tool insert utilized in machining cast iron has yttrium oxide to aluminum nitride weight percent ratio close to three, titanium nitride present in an amount half that of yttrium oxide, and the sum total of yttrium oxide, aluminum nitride and titanium nitride, all expressed in weight percent, is around seven, more particularly $7.1\pm0.5$. The preferred composition modification regarding titanium nitride, of a silicon nitride based cutting tool insert utilized in machining high nickel containing alloys, is found to contain titanium nitride in an amount three times that of the sum of the amount of yttrium oxide and aluminum nitride added to the mixture, and the preferred sum of the weight percents of yttrium oxide, aluminum nitride and titanium nitride is around twenty, more specifically 20±0.5. The yttrium oxide to aluminum nitride ratio, as in the first discussed composition, is preferably close to three.

The ceramic composition for the improved cutting tool insert manufactured in accordance with the present invention, contains silicon nitride of particle size less than 5 µm, preferably less than 2 µm, to which aluminum nitride and yttrium oxide, having particle size less than 5 µm, preferably less than 2 µm, are added in a weight percent ratio of 1:3. The preferred amount of aluminum nitride present in the mixture is 1.3±0.2 wt. %, and the preferred amount of yttrium oxide is 3.8±0.2 wt. %.

As it has been outlined above, in one of the preferred embodiments, that is in the mixture for producing ceramic cutting tool inserts utilized in machining cast iron, titanium nitride is added in an amount to bring the sum total of the weight percents of the additives to 7.1±0.5. In the other of the preferred embodiments, that is when the ceramic cutting insert is to be utilized in machining high nickel-containing alloys, titanium nitride is added to the mixture in an amount to bring the sum total of the additives to 20±0.5. The preferred titanium nitride addition is 2.0±0.3 wt. % in cutting inserts for machining cast iron articles, and 15.0±0.5 wt. % in cutting inserts for use in machining articles or cutting sheets made of alloys having high nickel content. The titanium nitride may be added as particles less than 2 µm, or as whiskers or as chopped filaments, or as a mixture of the above. It is considered that for health and environmental reasons the addition of titanium nitride as filaments is preferred over whiskers. The titanium filaments usually have lengths in excess of 200 µm, and diameter preferably in excess of 4 µm.

The mixture of composition as described above is subsequently milled by known methods in the presence of an aliphatic alcohol.

The milled ceramic mixture is cast into desired shapes and configurations in accordance with the intended application and end-use of the article, such as cutting tool inserts. The cast ceramic article is densified by hot pressure sintering or isostatically hot pressing by conventional methods at a temperature in excess of 1500° C., in nitrogen or inert gas atmosphere. The preferred temperature is higher than 1750° C.

The ceramic cutting tool inserts and similar abrasion resistant ceramic articles made of the silicon nitride based mixture of this invention, may also be densified by other conventional sintering methods, such as first cold pressing the article and subsequently sintering it in a nitrogen or inert gas atmosphere at high temperature and pressure.

The heat treated and densified ceramic cutting tool inserts and ceramic articles made of the composition described hereinabove have been found to have densities in excess of 99% of the theoretical density.

The fracture toughness of the cutting tool inserts made as described hereinabove has been found usually higher than 7 MPa·m$^{\frac{1}{2}}$, measured by the indentation method.

Furthermore, the hardness of the densified silicon nitride based mixture containing about 15.0 wt. % titanium nitride and the preferred amounts of yttrium oxide and aluminum nitride, has been found to be in excess of 16.5 GPa.

Examples to demonstrate the working of the present invention will now be given below.

Example 1

Commercially available silicon nitride was utilized for preparing a mixture containing 1.27 wt. % AlN, 3.8 wt. % $Y_2O_3$ and 2 wt. % of TiN, the balance being silicon nitride. The particle size of the components of the mixture was less than 2 µm. The mixture was milled in the presence of iso-propyl alcohol for 8 hours then vibro-milled for further 6 hours. The milled mixture was subsequently cast into commercially sized standard cutting tool inserts denoted as SMK42E2R.

The cast cutting tool inserts were isostatically hot pressure sintered (HIP) in nitrogen by first heating to 1750° C., then gradually raising the for an hour to 1850° C.

The obtained cutting tool inserts had density values corresponding to 99.4% of the theoretical density. The fracture toughness of the cutting inserts was found to be 7.6 MPa·m$^{\frac{1}{2}}$, measured by the indentation method.

Example 2

Commercially available silicon nitride was utilized in preparing a mixture containing 1.27 wt. % AlN, 3.8 wt. % $Y_2O_3$ and 15.0 wt. % TiN, the balance of the mixture was silicon nitride. A two thirds of the titanium nitride were added as particles and one third was added in the form of filaments having 25 cm length and 6 µm average diameter. All the components present as particles in the mixture had particle size less than 2 µm.

The silicon nitride based mixture was milled as described in Example 1, then cast into standard RNG 64 sized cutting tool inserts, which were subsequently pressure and heat treated to be densified and sintered, as described in Example 1.

The density of the densified cutting tool inserts obtained was found to be 99.2% of the theoretical density, and the fracture toughness measured by the indentation method was found to be 7.3 MPa·m$^{\frac{1}{2}}$. The hardness of the cutting tool inserts made and sintered as described above, was found to be 17.4 GPa.

Example 3 and 4

Ceramic cutting tool inserts obtained as described in Examples 1 and 2, were tested in machining metallic articles. It is customary that the machining speed is adjusted to the composition and hardness of the material to be machined. In comparing the performance of the cutting tool inserts, it is usual to measure tool wear rate or wear land edge of the insert, whichever is appropriate, after a number of articles have been machined or a given length of material has been cut, or a given time has elapsed in cutting and machining the material.

Cast iron articles were milled in the test utilizing SMK 42E2R cutting tool inserts. The cast iron articles were milled by a milling cutter holding 10 cutting tool inserts. The speed of the milling operation was 950 surface-feet per minute. It was found that 18 cast iron articles could be machined by the the milling cutter holding 10 SMK 42E2R cutting tool inserts, made as described in Example 1. In comparison, only 11 cast iron articles of the same dimensions could be milled with a milling cutter holding 10 commercially available silicon nitride based SMK 42E2R cutting tool inserts, before all the inserts had to be replaced.

A high nickel-content alloy known as WASPALOY was machined by utilizing cutting tool inserts RNG 64 manufactured as described in Example 2. Waspaloy turbine discs having dimensions 20" by 45" were machined by using inserts RNG 64. The surface speed applied was 800 surface-feet per minute, at feed rate of 0.008 IPR. The depth of cut was 0.100–0.250″. The time of cut was 2 minutes. Ten edges of cutting tool inserts made according to the present invention were tested and the results compared to tests made with commercially available RNG 64 cutting tool inserts. It was found that the wear land edge was 0.010 thou (1/1000 of an inch) in the case of RNG 64 inserts made as described in Example 2, compared to the wear land edge of 0.020 thou measured on conventional silicon nitride based RNG 64 cutting tool inserts.

Thus it is clearly demonstrated by the above described operations of machining cast iron and high nickel-containing steel that the abrasion resistance of cutting tool inserts of the present invention is substantially higher than that of conventional silicon nitride based cutting tool inserts.

It was also shown that the cutting tool made according to the present invention, were capable of performing at high cutting speeds and machining to the required depth, without thermal cracking. The desired heat conductivity and other advantageous properties of the present composition are clearly illustrated, thus providing hard, sintered ceramic articles. In particular, it may be concluded that the cutting inserts and other ceramic articles made of silicon nitride based mixture containing aluminum nitride, yttrium oxide in the above described weight percent ratio, and titanium nitride in weight percents which are tied to the amounts of aluminum nitride add yttrium oxide present in the mixture, have unexpectedly high abrasion resistance, fracture toughness and wear resistance. The density of the cutting inserts and other ceramic articles usually exceeded 99% theoretical density subsequent to high temperature densification.

The cutting inserts also exhibited high oxidation and corrosion resistance, were stable at the temperature of the cutting and machining operation and showed good heat conductance.

The composition of the present invention was used in manufacturing cutting inserts, but any other ceramic articles, such as nozzles, ceramic lining, mining tools, milling inserts, wherein high abrasion and wear resistance, resistance to oxidation, high heat dissipation, resistance to chemical corrosion, are desired properties, may also be made in accordance with the present invention.

Although the present invention has been described with reference to the preferred embodiments and examples, it is to be understood that modifications and variations may be resorted to without departing from the spirit and scope of the invention, as those skilled in the art readily understand. Such modifications and variations are considered to be within the purview and scope of the invention and the appended claims.

I claim:

1. In a densified silicon nitride based ceramic cutting tool insert essentially consisting of a silicon nitride based mixture consisting essentially of aluminum nitride, yttrium oxide, titanium nitride and silicon nitride, the improvement comprising that the amounts of aluminum nitride, yttrium oxide and titanium nitride present in the silicon nitride based mixture expressed in weight percents, prior to densification, are interrelated such that $$\frac{Y_2O_3}{AlN} = 3 +/- 0.1,$$

$$Y_2O_3 = 2\ TiN,$$
$$Y_2O_3 + AlN + TiN = 7.1 \pm 0.5,$$

and said densified silicon nitride based cutting tool insert has fracture toughness in excess of 7 MPa·m$^{\frac{1}{2}}$ measured by the indentation method.

2. A densified silicon nitride based ceramic cutting tool insert as claimed in claim 1, wherein said titanium nitride is present in said silicon nitride based mixture in at least one form selected from the group consisting of particles, whiskers and chopped filaments.

3. A densified silicon nitride based ceramic cutting tool insert as claimed in claim 2, wherein said titanium nitride is uniformly dispersed in said silicon nitride based mixture.

4. A densified silicon nitride based ceramic cutting tool insert as claimed in claim 1, consisting essentially of 3.8±0.2 weight percent yttrium oxide and 1.3+/−0.05 weight percent aluminum nitride.

5. In a densified silicon nitride based ceramic cutting tool insert essentially consisting of a silicon nitride based mixture consisting essentially of aluminum nitride, yttrium oxide, titanium nitride and silicon nitride, the improvement comprising that the amounts of aluminum nitride, yttrium oxide and titanium nitride present in the silicon nitride based mixture expressed in weight percents, prior to densification, are interrelated such that and said densified silicon nitride based cutting tool insert has hardness in excess of 16.5 GPa and fracture toughness in excess of Mpa·m$^{\frac{1}{2}}$ measured by the indentation method.

6. A densified silicon nitride based ceramic cutting tool insert as claimed in claim 5, wherein said titanium nitride is present in said silicon nitride based mixture in at least one form selected from the group consisting of particles, whiskers and chopped filaments.

7. A densified silicon nitride based ceramic cutting tool insert as claimed in claim 6, wherein said titanium nitride is uniformly dispersed in said silicon nitride based mixture.

8. A densified silicon nitride based ceramic cutting tool insert as claimed in claim 5, consisting essentially of 3.8±0.2 weight $$\frac{Y_2O_3}{AlN} = 3+/-0.1,$$

$$3(Y_2O_3 + AlN) = TiN,$$

$$Y_2O_3 + AlN + TiN = 20 \pm 0.5,$$

percent yttrium oxide and 1.3+/−0.05 weight percent aluminum nitride.

* * * * *